United States Patent
Burke et al.

(10) Patent No.: US 11,601,583 B2
(45) Date of Patent: Mar. 7, 2023

(54) SYSTEM AND METHOD FOR CONTROLLING SURVEILLANCE CAMERAS

(71) Applicant: JOHNSON CONTROLS TYCO IP HOLDINGS LLP, Milwaukee, WI (US)

(72) Inventors: Anthony Burke, Noblesville, IN (US); Piero Madar, Indianapolis, IN (US); Scott Humphreys, Indianapolis, IN (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 15/076,717

(22) Filed: Mar. 22, 2016

(65) Prior Publication Data

US 2017/0280043 A1    Sep. 28, 2017

(51) Int. Cl.
*H04N 5/232* (2006.01)
*H04N 7/18* (2006.01)
(Continued)

(52) U.S. Cl.
CPC ..... *H04N 5/23206* (2013.01); *H04L 65/1069* (2013.01); *H04L 65/1083* (2013.01);
(Continued)

(58) Field of Classification Search
CPC ................................................ H04N 5/23206
(Continued)

(56) References Cited

U.S. PATENT DOCUMENTS 3,217,098 A    11/1965 Oswald
4,940,925 A    7/1990 Wand et al.
(Continued)

FOREIGN PATENT DOCUMENTS

EP    2 164 003 A1    3/2010
EP    2 538 672 A1    12/2012
(Continued)

OTHER PUBLICATIONS

International Search Report and the Written Opinion of the International Searching Authority, dated May 31, 2017, from International Application No. PCT/US2017/023430, filed Mar. 21, 2017. Fourteen pages.

(Continued)

*Primary Examiner* — Dave Czekaj
*Assistant Examiner* — Shanika M Brumfield
(74) *Attorney, Agent, or Firm* — ArentFox Schiff LLP (57) ABSTRACT

A system and method for controlling surveillance cameras is enclosed. In the system, a surveillance camera system includes surveillance cameras configured as VoIP server endpoints. The surveillance cameras receive messages from client devices such as mobile user devices and computer workstations functioning as VoIP client endpoints. The client devices establish a voice communications channel with the surveillance cameras for receiving and controlling one or more streams of image data sent by the surveillance camera over the voice communications channel to the client device. In a preferred embodiment, the voice communications channel includes a control session based on Session Information Protocol (SIP) and a data channel that is based on Real time transfer protocol (RTP). The data channel preferably operates in half duplex mode, which limits the potential for collisions on the data channel when the surveillance cameras are transmitting their image data to the client devices.

10 Claims, 5 Drawing Sheets

(51) Int. Cl.
*H04L 65/1069* (2022.01)
*H04L 65/1083* (2022.01)
*H04L 65/612* (2022.01)
*H04L 65/613* (2022.01)
*G08B 13/196* (2006.01)

(52) U.S. Cl.
CPC .......... *H04L 65/612* (2022.05); *H04L 65/613* (2022.05); *H04N 7/181* (2013.01); *G08B 13/196* (2013.01)

(58) Field of Classification Search
USPC ......................................................... 348/159
See application file for complete search history.

(56) References Cited

U.S. PATENT DOCUMENTS

| | | | |
|---|---|---|---|
| 5,164,827 A | 11/1992 | Paff | |
| 5,204,536 A | 4/1993 | Vardi | |
| 5,317,394 A | 5/1994 | Hale et al. | |
| 5,729,471 A | 3/1998 | Jain et al. | |
| 5,850,352 A | 12/1998 | Moezzi et al. | |
| 5,940,538 A | 8/1999 | Spiegel et al. | |
| 5,951,695 A | 9/1999 | Kolovson | |
| 5,969,755 A | 10/1999 | Courtney | |
| 6,341,183 B1 | 1/2002 | Goldberg | |
| 6,359,647 B1 | 3/2002 | Sengupta et al. | |
| 6,581,000 B2 | 6/2003 | Hills et al. | |
| 6,643,795 B1 | 11/2003 | Sicola et al. | |
| 6,724,421 B1 | 4/2004 | Glatt | |
| 6,812,835 B2 | 11/2004 | Ito et al. | |
| 6,970,083 B2 | 11/2005 | Venetianer et al. | |
| 7,091,949 B2 | 8/2006 | Hansen | |
| 7,242,423 B2 | 7/2007 | Lin | |
| 7,286,157 B2 * | 10/2007 | Buehler ............. G06K 9/00771 348/143 |
| 7,342,489 B1 * | 3/2008 | Milinusic ......... G08B 13/19604 340/506 |
| 7,382,244 B1 * | 6/2008 | Donovan ......... G08B 13/19645 340/506 |
| 7,409,076 B2 | 8/2008 | Brown et al. | |
| 7,428,002 B2 * | 9/2008 | Monroe ........... G08B 13/19634 348/143 |
| 7,450,735 B1 | 11/2008 | Shah et al. | |
| 7,456,596 B2 | 11/2008 | Goodall et al. | |
| 7,460,149 B1 | 12/2008 | Donovan et al. | |
| 7,529,388 B2 | 5/2009 | Brown et al. | |
| 7,623,152 B1 | 11/2009 | Kaplinsky | |
| 7,623,676 B2 | 11/2009 | Zhao et al. | |
| 7,733,375 B2 | 6/2010 | Mahowald | |
| 7,996,718 B1 | 8/2011 | Ou et al. | |
| 8,249,301 B2 | 8/2012 | Brown et al. | |
| 8,300,102 B2 | 10/2012 | Nam et al. | |
| 8,325,979 B2 | 12/2012 | Taborowski et al. | |
| 8,482,609 B1 | 7/2013 | Mishra et al. | |
| 8,483,490 B2 | 7/2013 | Brown et al. | |
| 8,502,868 B2 | 8/2013 | Buehler et al. | |
| 8,558,907 B2 | 10/2013 | Goh et al. | |
| 8,594,482 B2 | 11/2013 | Fan et al. | |
| 8,675,074 B2 | 3/2014 | Salgar et al. | |
| 8,723,952 B1 * | 5/2014 | Rozenboim ............ H04N 7/181 348/143 |
| 8,849,764 B1 | 9/2014 | Long et al. | |
| 8,995,712 B2 | 3/2015 | Huang et al. | |
| 9,015,167 B1 | 4/2015 | Ballou et al. | |
| 9,058,520 B2 | 6/2015 | Xie et al. | |
| 9,094,615 B2 | 7/2015 | Aman et al. | |
| 9,129,179 B1 | 9/2015 | Wong | |
| 9,158,975 B2 | 10/2015 | Lipton et al. | |
| 9,168,882 B1 | 10/2015 | Mirza et al. | |
| 9,197,861 B2 | 11/2015 | Saptharishi et al. | |
| 9,280,833 B2 | 3/2016 | Brown et al. | |
| 9,412,269 B2 | 8/2016 | Saptharishi et al. | |
| 9,495,614 B1 | 11/2016 | Boman et al. | |
| 9,594,963 B2 | 3/2017 | Bobbitt et al. | |
| 9,641,763 B2 | 5/2017 | Bernal et al. | |
| 9,674,458 B2 | 6/2017 | Teich et al. | |
| 9,785,898 B2 | 10/2017 | Hofman et al. | |
| 9,860,554 B2 | 1/2018 | Samuelsson et al. | |
| 9,965,680 B2 | 5/2018 | Burke et al. | |
| 9,967,446 B2 | 5/2018 | Park | |
| 2002/0104098 A1 | 8/2002 | Zustak et al. | |
| 2003/0107649 A1 | 6/2003 | Flickner et al. | |
| 2003/0169337 A1 | 9/2003 | Wilson et al. | |
| 2005/0012817 A1 | 1/2005 | Hampapur et al. | |
| 2005/0057653 A1 | 3/2005 | Varuya | |
| 2006/0001742 A1 * | 1/2006 | Park ....................... H04N 7/181 348/143 |
| 2006/0173856 A1 | 8/2006 | Jackson et al. | |
| 2006/0181612 A1 * | 8/2006 | Lee ........................ H04N 5/232 348/207.1 |
| 2006/0239645 A1 | 10/2006 | Curtner et al. | |
| 2006/0243798 A1 | 11/2006 | Kundu et al. | |
| 2007/0178823 A1 | 8/2007 | Aronstam et al. | |
| 2007/0182818 A1 * | 8/2007 | Buehler ............ G08B 13/19602 348/143 |
| 2007/0279494 A1 | 12/2007 | Aman et al. | |
| 2007/0294207 A1 | 12/2007 | Brown et al. | |
| 2008/0004036 A1 | 1/2008 | Bhuta et al. | |
| 2008/0101789 A1 | 5/2008 | Sharma | |
| 2008/0114477 A1 | 5/2008 | Wu | |
| 2008/0158336 A1 * | 7/2008 | Benson ................. H04L 65/602 348/14.08 |
| 2009/0237508 A1 | 9/2009 | Arpa et al. | |
| 2009/0268033 A1 | 10/2009 | Ukita | |
| 2009/0273663 A1 | 11/2009 | Yoshida | |
| 2009/0284601 A1 | 11/2009 | Eledath et al. | |
| 2010/0013917 A1 | 1/2010 | Hanna et al. | |
| 2010/0110212 A1 | 5/2010 | Kuwahara et al. | |
| 2010/0153182 A1 | 7/2010 | Quinn et al. | |
| 2010/0232288 A1 | 9/2010 | Coatney et al. | |
| 2011/0043631 A1 | 2/2011 | Marman et al. | |
| 2011/0128384 A1 | 6/2011 | Tiscareno et al. | |
| 2011/0246626 A1 | 10/2011 | Peterson et al. | |
| 2011/0289119 A1 | 11/2011 | Hu et al. | |
| 2011/0289417 A1 | 11/2011 | Schaefer et al. | |
| 2011/0320861 A1 | 12/2011 | Bayer et al. | |
| 2012/0072420 A1 | 3/2012 | Moganti et al. | |
| 2012/0098969 A1 * | 4/2012 | Wengrovitz ........... H04N 7/181 348/159 |
| 2012/0206605 A1 | 8/2012 | Buehler et al. | |
| 2012/0226526 A1 | 9/2012 | Donovan et al. | |
| 2013/0166711 A1 * | 6/2013 | Wang ..................... H04N 7/181 709/223 |
| 2013/0169801 A1 | 7/2013 | Martin et al. | |
| 2013/0223625 A1 * | 8/2013 | de Waal ................ H04N 5/232 380/243 |
| 2013/0278780 A1 | 10/2013 | Cazier et al. | |
| 2013/0343731 A1 * | 12/2013 | Pashkevich ............. H04N 5/91 386/328 |
| 2014/0085480 A1 * | 3/2014 | Saptharishi .............. G06F 16/71 348/159 |
| 2014/0172627 A1 | 6/2014 | Levy et al. | |
| 2014/0211018 A1 | 7/2014 | de Lima et al. | |
| 2014/0218520 A1 | 8/2014 | Teich et al. | |
| 2014/0282991 A1 | 9/2014 | Watanabe et al. | |
| 2014/0330729 A1 | 11/2014 | Colangelo | |
| 2014/0362223 A1 | 12/2014 | LaCroix et al. | |
| 2015/0039458 A1 | 2/2015 | Reid | |
| 2015/0092052 A1 | 4/2015 | Shin et al. | |
| 2015/0121470 A1 | 4/2015 | Rongo et al. | |
| 2015/0208040 A1 | 7/2015 | Chen et al. | |
| 2015/0215583 A1 | 7/2015 | Chang | |
| 2015/0244992 A1 | 8/2015 | Buehler | |
| 2015/0249496 A1 | 9/2015 | Muijs et al. | |
| 2015/0294119 A1 | 10/2015 | Gundam et al. | |
| 2015/0358576 A1 | 12/2015 | Hirose et al. | |
| 2015/0379729 A1 | 12/2015 | Datta et al. | |
| 2015/0381946 A1 | 12/2015 | Renkis | |
| 2016/0014381 A1 * | 1/2016 | Rolf ....................... H04N 7/186 348/14.07 |
| 2016/0065615 A1 | 3/2016 | Scanzano et al. | |

(56) References Cited

U.S. PATENT DOCUMENTS

| | | | |
|---|---|---|---|
| 2016/0224430 A1 | 8/2016 | Long et al. | |
| 2016/0225121 A1 | 8/2016 | Gupta et al. | |
| 2016/0269631 A1* | 9/2016 | Jiang | H04N 5/23238 |
| 2016/0357648 A1 | 12/2016 | Keremane et al. | |
| 2016/0379074 A1 | 12/2016 | Nielsen et al. | |
| 2017/0193673 A1 | 7/2017 | Heidemann et al. | |
| 2017/0277785 A1 | 9/2017 | Burke | |
| 2017/0277947 A1* | 9/2017 | Burke | G06K 9/00496 |
| 2017/0277967 A1 | 9/2017 | Burke et al. | |
| 2017/0278137 A1 | 9/2017 | Burke | |
| 2017/0278365 A1 | 9/2017 | Madar et al. | |
| 2017/0278366 A1 | 9/2017 | Burke et al. | |
| 2017/0278367 A1 | 9/2017 | Burke et al. | |
| 2017/0278368 A1 | 9/2017 | Burke | |
| 2017/0280043 A1 | 9/2017 | Burke et al. | |
| 2017/0280102 A1 | 9/2017 | Burke | |
| 2017/0280103 A1 | 9/2017 | Burke et al. | |

FOREIGN PATENT DOCUMENTS

| | | |
|---|---|---|
| JP | 2003/151048 A | 5/2003 |
| JP | 2010/074382 A | 4/2010 |
| WO | 2007/030168 A1 | 3/2007 |
| WO | 2013/141742 A1 | 9/2013 |
| WO | 2014/114754 A1 | 7/2014 |

OTHER PUBLICATIONS

International Search Report and the Written Opinion of the International Searching Authority, dated Jun. 12, 2017, from International Application No. PCT/US2017/023440, filed on Mar. 21, 2017. Fourteen pages.

International Search Report and the Written Opinion of the International Searching Authority, dated Jun. 19, 2017, from International Application No. PCT/US2017/023436, filed on Mar. 21, 2017. Fourteen pages.

International Search Report and the Written Opinion of the International Searching Authority, dated Jun. 21, 2017, from International Application No. PCT/US2017/023444, filed on Mar. 21, 2017. Thirteen pages.

International Search Report and the Written Opinion of the International Searching Authority, dated Jun. 28, 2017, from International Application No. PCT/US2017/023434, filed on Mar. 21, 2017. Thirteen pages.

International Preliminary Report on Patentability, dated Oct. 4, 2018, from International Application No. PCT/US2017/023440, filed on Mar. 21, 2017. Eight pages.

International Preliminary Report on Patentability, dated Oct. 4, 2018, from International Application No. PCT/US2017/023434, filed on Mar. 21, 2017. Eight pages.

International Preliminary Report on Patentability, dated Oct. 4, 2018, from International Application No. PCT/US2017/023430, filed Mar. 21, 2017. Eight pages.

International Preliminary Report on Patentability, dated Oct. 4, 2018, from International Application No. PCT/US2017/023436, filed on Mar. 21, 2017. Eight pages.

International Preliminary Report on Patentability, dated Oct. 4, 2018, from International Application No. PCT/US2017/023444, filed on Mar. 21, 2017. Seven pages.

Weilin, L., et al., "Personalizaation of Trending Tweets Using Like-Dislike Caegory Model," Procedia Computer Science, 60: 236-245 (2015).

* cited by examiner

SYSTEM AND METHOD FOR CONTROLLING SURVEILLANCE CAMERAS

RELATED APPLICATIONS

This application is related to:

U.S. application Ser. No. 15/076,701 filed on Mar. 22, 2016, entitled "Method and system for surveillance camera arbitration of uplink consumption," now U.S. Patent Publication No.: US2017/0278368A1;

U.S. application Ser. No. 15/076,703 filed on Mar. 22, 2016, entitled "Method and system for pooled local storage by surveillance cameras," now U.S. Patent Publication No.: US2017/0280102A1;

U.S. application Ser. No. 15/076,704 filed on Mar. 22, 2016, entitled "System and method for designating surveillance camera regions of interest," now U.S. Patent Publication No.: US2017/0277967A1;

U.S. application Ser. No. 15/076,705 filed on Mar. 22, 2016, entitled "System and method for deadzone detection in surveillance camera network," now U.S. Patent Publication No.: US2017/0278366A1;

U.S. application Ser. No. 15/076,706 filed on Mar. 22, 2016, entitled "System and method for overlap detection in surveillance camera network," now U.S. Patent Publication No.: US2017/0278367A1;

U.S. application Ser. No. 15/076,708 filed on Mar. 22, 2016, entitled "System and method for retail customer tracking in surveillance camera network," now U.S. Patent Publication No.: US2017/0278137A1;

U.S. application Ser. No. 15/076,709 filed on Mar. 22, 2016, entitled "Method and system for modeling image of interest to users," now U.S. Patent Publication No.: US2017/0277785A1;

U.S. application Ser. No. 15/076,710 filed on Mar. 22, 2016, entitled "System and method for using mobile device of zone and correlated motion detection," now U.S. Patent Publication No.: US2017/0280103A1;

U.S. application Ser. No. 15/076,712 filed on Mar. 22, 2016, entitled "Method and system for conveying data from monitored scene via surveillance cameras," now U.S. Patent Publication No.: US2017/0277947A1;

U.S. application Ser. No. 15/076,713 filed on Mar. 22, 2016, entitled "System and method for configuring surveillance cameras using mobile computing devices," now U.S. Patent Publication No.: US2017/0278365A1.

BACKGROUND OF THE INVENTION

Surveillance camera systems using Internet protocol (IP) surveillance cameras have become increasingly common. These cameras utilize standard protocols over wired and/or wireless networks.

Image data captured by these cameras can be stored a No. of ways. Often the image data is sent for storage in possibly a local network video recording (NVR) system, which may also distribute the image data for display to users. Even more recently, surveillance cameras have been offered that include image data storage on the camera itself. The image data is then accessible by users by directly accessing the surveillance cameras.

In a typical example for accessing image data from an IP surveillance camera, a user interacts with an application on a user device such as a mobile phone. The application is typically browser or app based and enables the user to enter selection information such as the IP address of the surveillance camera as a destination IP address, username and password, and timeframe over which the image data was recorded. This information is then included in a request message, and sent over a surveillance camera network that includes the surveillance camera. In response, the IP surveillance camera either delivers a stream of the selected image data to the user device for real time display of the image data, or provides the image data for downloading to the user device.

SUMMARY OF THE INVENTION

Voice over IP (VoIP) includes technologies for the delivery of voice communications over IP based networks. Businesses have increasingly turned to VoIP as a lower cost alternative to circuit-switched technologies that use the public switch telephone network (PSTN). Technologies employed by VoIP systems include Session Information Protocol (SIP) and Real time Protocol (RTP), in examples. Communicating endpoints in VoIP sessions have traditionally included user devices such a IP telephones, laptops, and mobile phones.

It would be beneficial to provide an implementation of VoIP communications protocols for the surveillance cameras of a surveillance camera system. These protocols are very well developed, and infrastructure exists to support devices using these protocols. Moreover, the protocols enable the setup and transfer of image data from surveillance cameras to any client device that is already enabled to receive VoIP transmissions. In this way, the VoIP enabled surveillance cameras can take advantage of the same bandwidth efficiency and low cost of transmission for transfer of image data to client devices that current VoIP telephony systems leverage.

In general, according to one aspect, the invention features a system delivering image data from a surveillance camera. The system comprises a client device that establishes a voice communications channel, such as a VoIP transmission, for receiving and controlling one or more streams of image data generated by the surveillance camera.

In embodiments, the voice communications channel comprises a control session that the client device establishes with the surveillance camera, local image data storage system and/or cloud image data storage system. The client device controls the one or more streams of image data via the control session, which authorizes the client device.

In implementations, the control session is based upon the Session Initiation Protocol (SIP). The voice communications channel can further comprise a data channel over which the client device receives the one or more streams of image data from the surveillance camera. This data channel can be based upon the Real time Transfer Protocol (RTP) and might be is a half duplex data channel.

Usually, the surveillance camera will be an IP surveillance camera including an application server that establishes the voice communications channel with the client device. In a preferred implementation, the one or more streams of image data are stored within the surveillance cameras.

In one embodiment, an application server of the surveillance camera includes a SIP layer based on an implementation of the Session Initiation Protocol (SIP) for establishing a control session of the voice communications channel, for controlling the one or more streams of image data sent by the surveillance camera to the client device and an RTP layer based on an implementation of the Real Time Protocol (RTP) for establishing a half duplex data channel of the voice communications channel, for sending the one or more streams of image data to the client device.

In general, according to one aspect, the invention features a method for delivering image data from a surveillance camera. This method comprises a client device establishing a voice communications channel and receiving and controlling one or more streams of image data originating from the surveillance camera over the voice communications channel.

In general, according to another aspect, the invention features a method for enabling communications with a surveillance camera. The method comprises a client device establishing a voice communications channel with the surveillance camera, and receiving and controlling one or more streams of image data sent by the surveillance camera over the voice communications channel.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
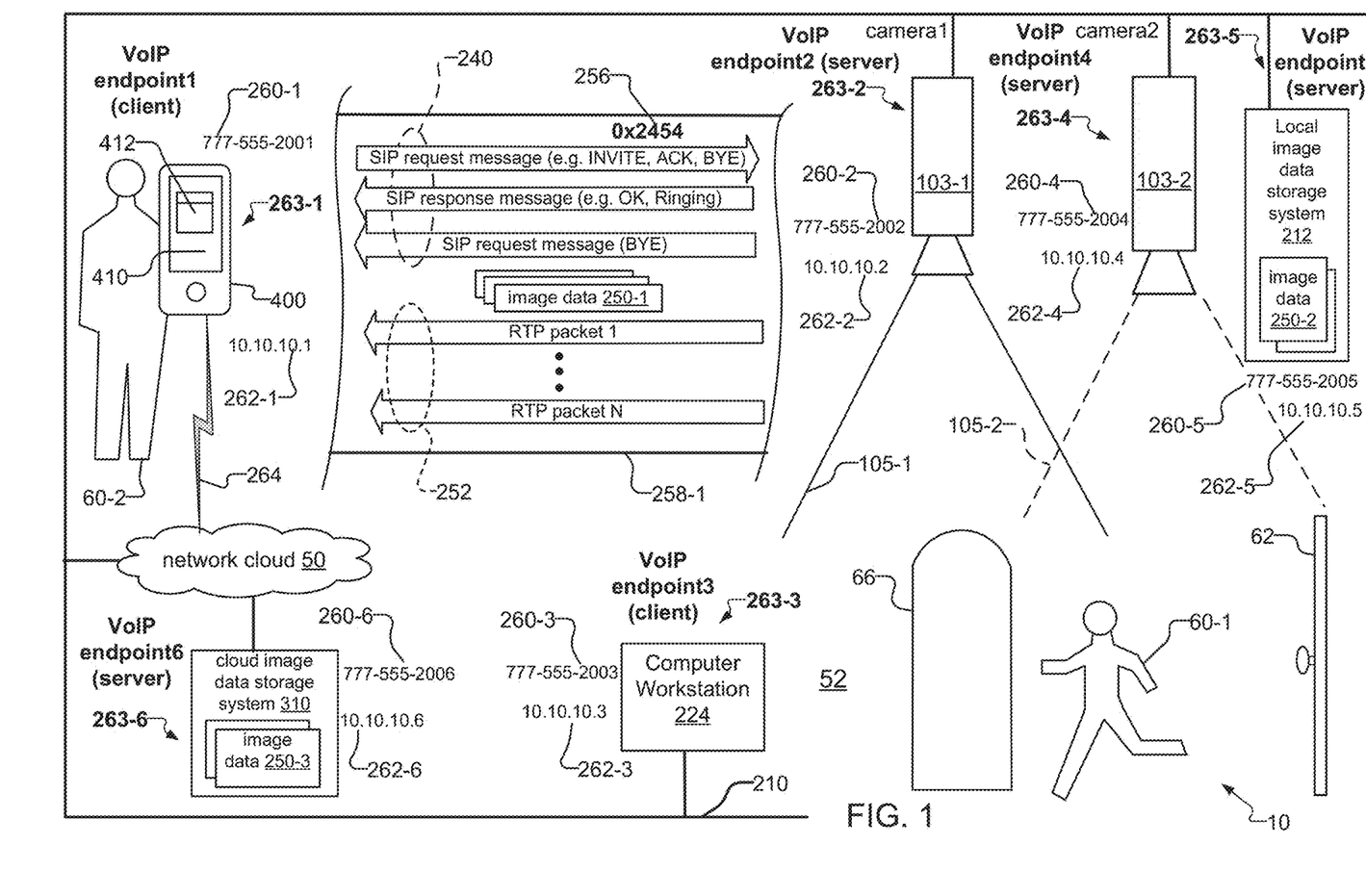
FIG. 1 shows a surveillance camera system according to the present invention.

FIG. 1 shows an exemplary surveillance camera system 10 constructed according to the principles of the present invention.

The system 10 includes IP surveillance cameras 103-1 through 103-N, a computer workstation 224, and possibly a local image data storage system 212 that communicate over a local network 210. The system also possibly includes a cloud image data storage system 310 that is accessible by the surveillance cameras 103 via a network cloud 50.

A user 60-2 holds a mobile user computing device 400 for communicating with the surveillance cameras 103 or the image data storage systems 212, 310. Each mobile user device 400 includes a display screen 410 and one or more applications 412, or "apps." The apps 412 display information to the user 60-2 via the display screen 410 of the mobile user device 400. The apps 412 execute upon the operating system of the mobile user device 400. The apps 412 communicate with the application server 220 over a network cloud 50 via a wireless connection 264. Examples of mobile user computing devices 400 include smartphones, tablet computing devices, and laptop computers running operating systems such as Windows, Android, Linux, or IOS, in examples.

In the illustrated example, surveillance cameras 103 such as camera1 103-1 and camera2 103-2 might be installed within a premises 52. Field of view 105-1 of camera1 103-1 might be directed to capture individuals 60-1 as they enter or exit through a doorway 66 of the premises, for example. Field of view 105-2 of camera2 103-2 captures activity near a door 62, in the example.

In one embodiment, image data 250 captured by the camera is stored locally within the respective cameras 103. In another embodiment, the surveillance cameras 103 send their image data 250-2 over the local network 210 for storage on the local image data storage system 212. In one example, the local image data storage system 212 is a network video recorder (NVR). In yet another embodiment, the surveillance cameras 103 send their image data 250-3 over the network cloud 50 for remote storage on the cloud image data storage system 310.

VoIP communications can occur between peer VoIP endpoint devices, also known as VoIP endpoints 263. Each VoIP endpoint 263 includes a unique IP address 262 and possibly a phone No. 260. The phone No. 260 can be private to an organization or local network, or can be a public phone No., in examples. Mobile user device 400 and computer workstation 224 are configured as VoIP client endpoint devices, namely VoIP endpoint1 263-1 and VoIP endpoint3 263-3, respectfully. Each VoIP client endpoint 263 first establishes a separate voice communications channel 258 with a VoIP server endpoint 263, and then requests image data 250 and/or audio data from the VoIP server endpoint 263 over the associated voice communications channel 258.

VoIP server endpoints 263 can include surveillance cameras 103, the local image data storage system 212, and the cloud image data storage system 310, in examples. In the illustrated example, the VoIP server endpoints 263 are VoIP server endpoint2 263-2 (camera1 103-1), VoIP server endpoint2 263-4 (camera4 103-4), VoIP endpoint5 263-5 (local image data storage system 212), and VoIP server endpoint6 263-6 (cloud image data storage system 310).

In the illustrated example, mobile user device 400 is configured as VoIP client endpoint1 263-1 and includes phone No. 260-1 "777-555-2001" and IP address "10.10.10.1." In a similar vein, computer workstation 224 is configured as VoIP client endpoint3 263-3 and includes phone No. 260-3 "777-555-2003" and IP address 262-3 "10.10.10.3."

Surveillance camera1 103-1 is configured as VoIP server endpoint2 263-2 and includes phone No. 260-2 777-555-2002" and IP address 262-2 "10.10.10.2." Surveillance camera2 103-2 is configured as VoIP endpoint4 263-4 and includes phone No. 260-4 "777-555-2004" and IP address 262-4 "10.10.10.4." Local image data storage system 212 is configured as VoIP server endpoints 263-5 and includes phone No. 260-5 "777-555-2005" and IP address 262-5 "10.10.10.5," Finally, cloud image data storage system 310 is configured as a VoIP server endpoint6 263-6 and includes phone No. 260-6 "777-555-2006" and IP address 262-6 "10.10.10.6."

An exemplary voice communications channel 258-1 between VoIP client endpoint1 263-1 (mobile user device 400) and VoIP server endpoint2 263-2 camera1 103-1 is shown. The voice communications channel 258-1 includes a control session 240 and a data channel 252. The control session 240 enables exchange of control and/or signaling information between the VoIP client endpoint 263-1 and VoIP server endpoint 263-2, while the data channel 252 enables exchange of audio and/or image data 250. To distinguish between control sessions 240 and therefore between the voice communications channels 258, each control session 240 has a unique session ID 256.

The control session 240 is preferably an IP based control session that is based upon the Session Information Protocol (SIP) but can also be implemented according to other standard and proprietary signaling protocols. Other VoIP signaling protocols include IAX, H.323, and XMPP, in examples. Control functions provided by the control session 240 include call setup functions between the endpoints 263-1/263-2 that are analogous to a traditional telephone such as the initial call request, confirmation of call request, termination of call (SIP request messages INVITE, ACK, and BYE, respectively), and ringing of a phone and busy tone (SIP response message codes 180 "Ringing" and 486 "Busy Here") in examples. Other control functions provided by the control session 240 include commands sent from VoIP client endpoint1 263-1 for requesting available resources on the camera1 103-1 such as selected frames of image data 250 and available disk space, in examples.

The data channel 252 is preferably implemented as a half duplex data channel and is preferably based upon the real-time transfer protocol (RTP). For this reason, the data channel 252 can also be referred to as an RIP session between two VoIP endpoints 263. A half duplex implementation for the data channel 252 is preferred to maximize the likelihood that image data 250 is transferred at maximum throughput with minimum loss over the voice communications channel 258. This is because when the VoIP server endpoint 263-2 is transmitting its image data of the current stream over the data channel 252 to the VoIP client endpoint 263-1, the VoIP client endpoint 263-2 cannot send RTP messages to the VoIP server endpoint 263-2 until the VoIP server endpoint 263-2 has completed transmission of the image data 250.

When configured as VoIP server endpoints 263, the surveillance cameras 103 function as video phones that automatically answer calls initiated by authenticated VoIP client endpoints 263. The authentication (e.g. authorization) is typically provided by the control session 240 portion of the voice communications channel 258. Upon establishing the authenticated control session 240, audio and/or image data is transmitted from the surveillance cameras 103 to the VoIP client endpoints 263-1/263-3 via the data channel 252. The data channel 252 is preferably operated in half duplex mode to avoid sending unwanted video and/or audio to the cameras 103 while the cameras 103 are transmitting their audio and/or image data to the VoIP client endpoints 263.

The control session 240 is preferably based upon an implementation of SIP. In this way, the VoIP client endpoints 263 can use existing SIP commands to control the streams of image data 250-1 from the surveillance cameras 103 in a manner similar to the way in which VoIP client endpoints 263 control video from VoIP server endpoints 263 of a traditional VoIP video conferencing call, in one example.

For the SIP based implementation of the data channel 252, the VoIP server endpoint 263-2 assembles the image data 250 into RTP packets for transmission over the data channel 252. In examples, the RTP based data channel 252 can support best effort delivery over UDP and/or reliable delivery over TCP. Best effort delivery is favored for several reasons. These reasons include the fact that reliable delivery often causes significant delays due to retransmission of lost frames, and that reliable delivery consumes more bandwidth than best effort delivery. Finally, because the content of frames of image data 250 from surveillance cameras typically do not change much from frame to frame, a small amount of image data loss inherent when using best effort delivery is most often an acceptable tradeoff in favor of the improved transmission speed and bandwidth utilization provided by best effort delivery.

Figure 2:
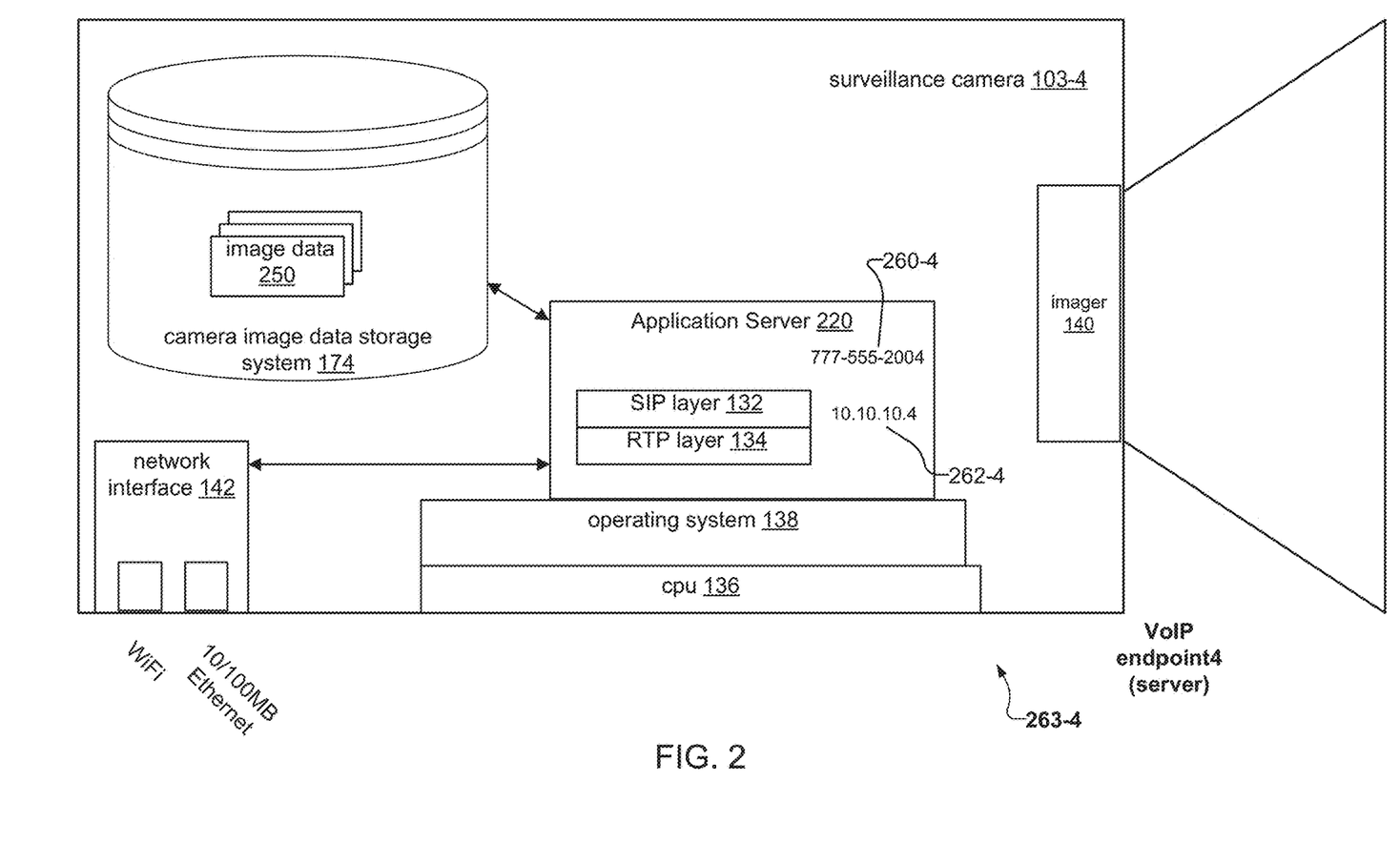
FIG. 2 is a schematic diagram of an embodiment of a surveillance camera that supports VoIP communications for control and transfer of image data from the surveillance camera to a client device, in accordance with principles of the present invention.

FIG. 2 shows some of the components of an exemplary surveillance camera 103-4. In the example, the surveillance camera 103 stores its image data 250 locally and includes an integrated application server 220 as a process. Surveillance camera 103-4 is also configured as a VoIP server endpoint 263-4.

The camera 103 includes a processing unit (CPU) 138, an imager 140, a camera image data storage system 174 and a network interface 142. An operating system 136 runs on top of the CPU 138. The surveillance camera 103 saves image data 250 captured by the imager 140 to the camera image data storage system 174. Each camera 103 can support one or more streams of image data 250. The application server 220 receives and sends messages 264 via its network interface 142.

A No. of processes or software applications are executed by the operating system 136. The processes include an application server 220. The application server 220, in turn, includes a SIP based control session 240 implementation, or SIP layer 132, and an RTP based data channel 252 implementation, or RTP layer 134. Because the application server 220 enables the surveillance camera 103-4 to function as a VoIP endpoint 263, the application server 220 also maintains a phone No. 260-4 and an IP address 262-4 for the VoIP server endpoint 263-4.

The application server 220 preferably includes a SIP layer 132 based on an implementation of the Session Initiation Protocol (SIP) for establishing an IP based control session 240 of the voice communications channel 258-1, for controlling the one or more streams of image data 250-1 sent by the surveillance camera 103 to the client device 400/224. The surveillance camera 103 operates as a VoIP server endpoint 263-1, where the client device 400/224 operates as a VoIP client endpoint 263-1.

The application server 220 also preferably includes a RTP layer 134 based on an implementation of the Real Time Protocol (RTP) for establishing a half duplex data channel 252 of the voice communications channel 258-1, for sending the one or more streams of image data 250-1 to the client device 400/224.

Figure 3A:
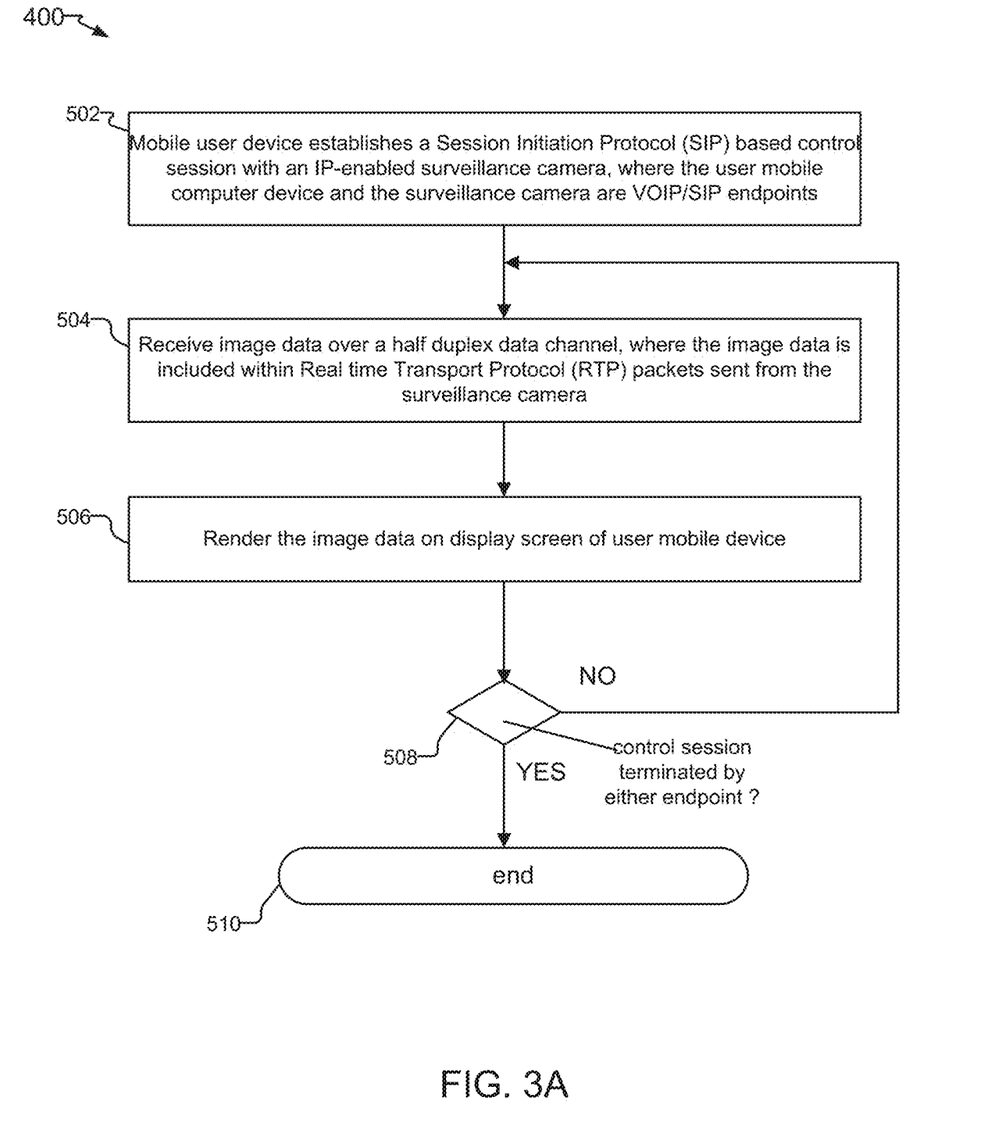
FIGS. 3A and 3B are flow diagrams showing methods for exemplary mobile user device and computer workstation client devices, respectively, where the client devices are configured as VoIP client endpoints that establish a voice communications channel with an IP surveillance camera configured as a VoIP server endpoint, and where the client devices accessing image data from the surveillance camera over the voice communications channel.

FIG. 3A shows a method for a mobile user device 400 configured as a VoIP client endpoint 263-1 to access image data 250 from an IP surveillance camera 103 configured as a VoIP server endpoint 263.

In step 502, a mobile user device 400 establishes a Session Initiation Protocol (SIP) based control session with an IP-enabled surveillance camera 103, where the user mobile computer device and the surveillance camera 103 are VoIP/SIP endpoints 263. In step 504, the mobile user device 400 receives image data 250 over a half duplex data channel 252, where the image data 250 is included within Real time Transport Protocol (RTP) packets sent from the surveillance camera 103. Then, in step 506, the mobile user device 400 renders the image data 250 on the display screen 410 of the user mobile device 400.

According to step 508, the method tests whether the control session 240 was terminated by either endpoint (e.g. via a SIP "BYE" request message of the control session 240). If this resolves to true, the method terminates in step 510. Otherwise, the method transitions to the beginning of step 504 to process the next frame of image data 250 to be sent over the half duplex data channel 252 to the client device 400.

Figure 3B:
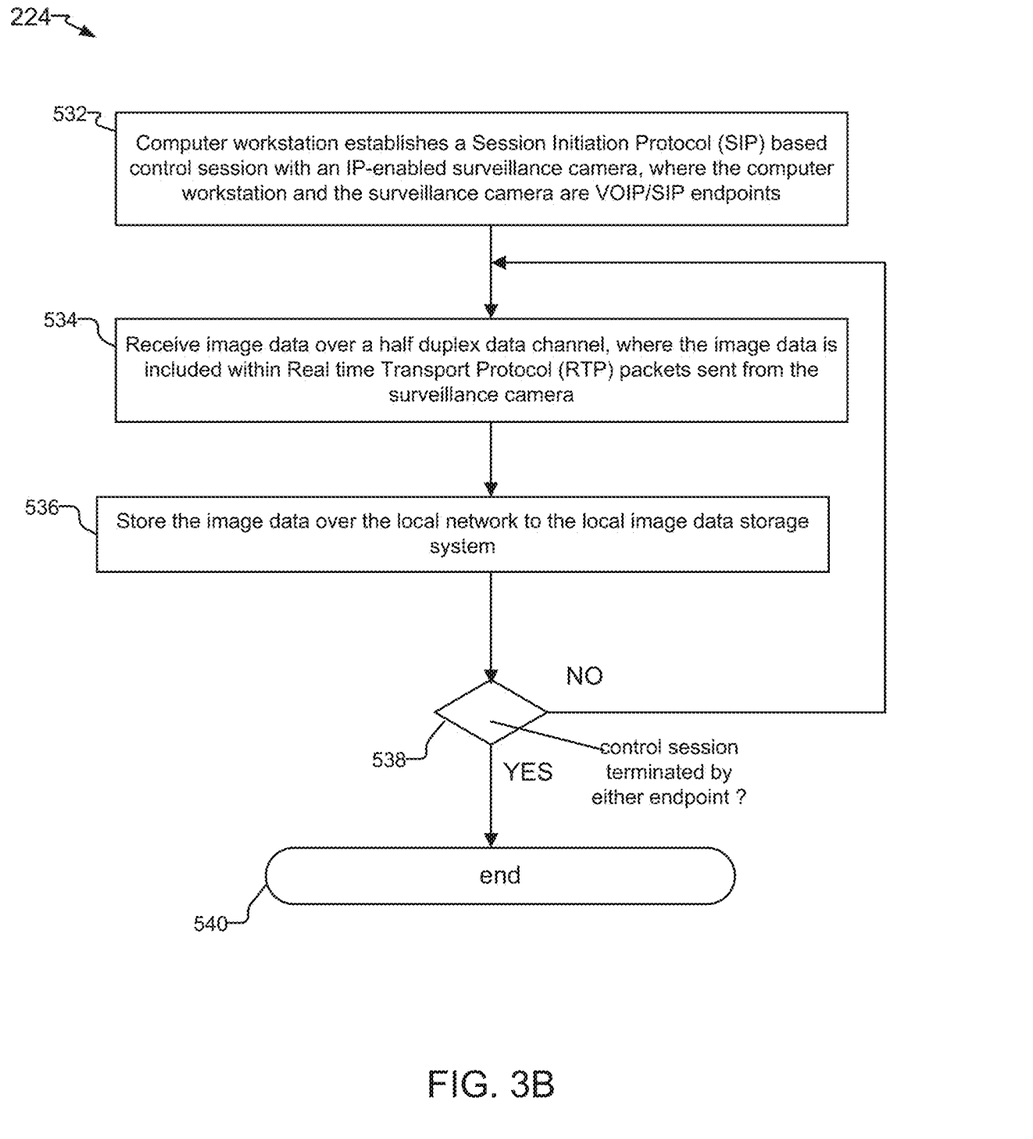

FIG. 3B shows a method for a computer workstation 224 configured as a VoIP client endpoint 263-1 to access image data 250 from an IP surveillance camera 103 configured as a VoIP server endpoint 263.

In step 532, a computer workstation 224 establishes a Session Initiation Protocol (SIP) based control session with an IP-enabled surveillance camera 103, where the computer workstation 224 and the surveillance camera 103 are VoIP/SIP endpoints 263. In step 534, the computer workstation 224 receives image data 250 over a half duplex data channel 252, where the image data 250 is included within Real time Transport Protocol (RTP) packets sent from the surveillance camera 103. Then, in step 536, the computer workstation 224 saves the image data 250-2 over the local network 210 to the local image data storage system 212. It can also be appreciated that the computer workstation 224 can alternatively save the image data 250-3 over the network cloud 50 to the cloud image data storage system 310.

According to step 538, the method tests whether the control session 240 was terminated by either endpoint (e.g. via a SIP "BYE" request message of the control session 240). If this resolves to true, the method terminates in step 540. Otherwise, the method transitions to the beginning of step 534 to process the next frame of image data 250 sent over the half duplex data channel 252 to the client device 224.

Figure 4:
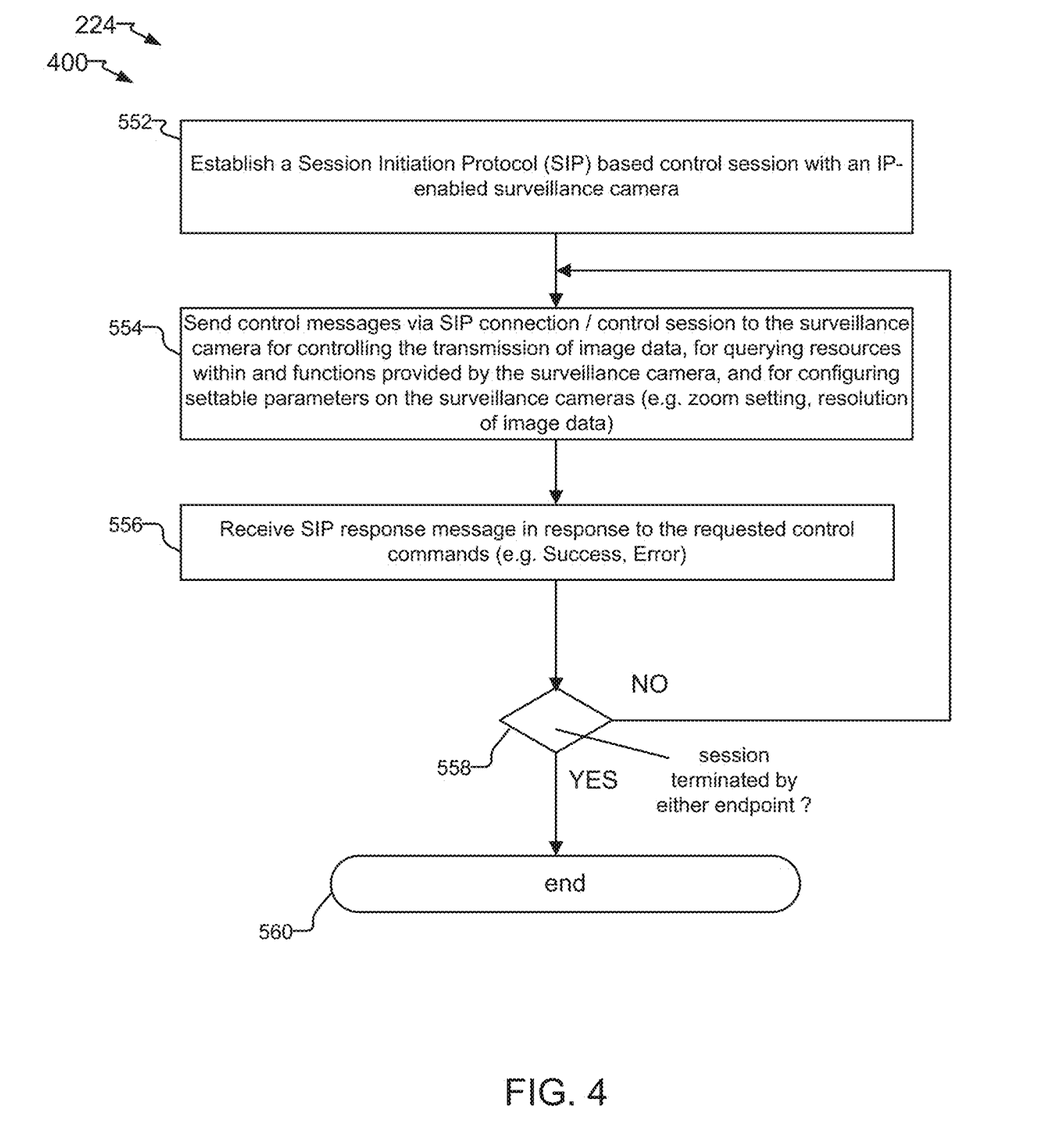
FIG. 4 is a flow diagram showing a method for a VoIP client endpoint device establishing a Session Initiation Protocol (SIP) based control session of the voice communications channel with an IP surveillance camera as a VoIP server endpoint, where the control session enables the VoIP client endpoint device to send control messages for controlling the transmission of image data from the IP surveillance camera and for configuring parameters on the IP surveillance camera.

FIG. 4 shows a method for a VoIP client endpoint 263 device establishing a Session Initiation Protocol (SIP) based control session 240 with an IP surveillance camera 103 as a VoIP server endpoint 263 and sending control messages over the control session 240. The control session 240 is one component of a separate voice communications channel 258 established between each of the VoIP client endpoints 263 and each VoIP server endpoint 263.

In step 552, the client device 224/400 establishes a Session Initiation Protocol (SIP) based control session 240 with an IP-enabled surveillance camera 103 configured as a VoIP server endpoint 263. In step 554, the client device 224/400 sends control messages over the SIP connection/control session 240 to the surveillance camera 103. In one example, the control messages query the surveillance camera 103 to obtain the list of current resources and available functions provided by the surveillance camera 103. In another example, the control messages control the transmission of image data 250 from and configure settable parameters on the surveillance cameras (e.g. zoom setting, resolution of image data 250).

In examples, the control messages for controlling the streams of image data 250 include commands for cancelling requests for image data 250, terminating a call to tear down the voice communications channel 258, and setting parameters on the surveillance camera 103. Control messages based on the SIP request message types CANCEL, BYE, and MESSAGE types, respectively, can be utilized for these purposes, in one implementation.

In other example, the list of current resource information can include the No. of streams of image data 250 supported, the disk space available on the camera image data storage system 174, codec information of the imager 140, software versions of the SIP layer 132 and/or RTP layer 134 within the application server 220 of the surveillance camera 103. A control message based on the SIP request message types OPTIONS and/or INFO can be utilized for these purposes, in one implementation.

According to step 556, the client device 224/400 receives a SIP response message in response to the requested control commands (e.g. Success, Error). In step 558, the method tests whether the control session 240 was terminated by either endpoint (e.g. via a SIP "BYE" request message of the control session 240). If this resolves to true, the method terminates in step 560. Otherwise, the method transitions to the beginning of step 554 to process the next control message sent over the SIP based control session 252.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system delivering image data, comprising:
   a surveillance camera;
   a client device that establishes a voice communications channel for receiving and controlling one or more streams of image data generated by the surveillance camera; and
   an application server of the surveillance camera that includes:
   a Session Initiation Protocol (SIP) layer implementing SIP for establishing a control session of the voice communications channel, wherein the SIP layer automatically answers a call from the client device based on the client device being authenticated and the control session controls the one or more streams of image data sent by the surveillance camera to the client device in response to the call; and a Real Time Protocol (RTP) layer implementing RTP for establishing a half duplex data channel of the voice communications channel, for sending the one or more streams of image data to the client device.

2. The system of claim 1, wherein the client device controls the one or more streams of image data via the control session.

3. The system of claim 1, wherein the control session authenticates the client device.

4. The system of claim 1, wherein the image data of the one or more streams of image data are stored within the surveillance camera.

5. A method for deliveringreceiving image data from a surveillance camera, the method comprising:

establishing, with the surveillance camera, a voice communications channel for receiving one or more streams of image data generated by the surveillance camera;

establishing, with a Session Initiation Protocol (SIP) layer of an application server of the surveillance camera, a control session of the voice communications channel in response to a call automatically answered by the SIP layer, wherein the control session controls the one or more streams of image data received from the surveillance camera and a Real Time Protocol (RTP) layer implementing the RTP for establishing a half duplex data channel of the voice communications channel;

receiving, via the half duplex data channel of the voice communications channel, the one or more streams of frames of image data originating from the surveillance camera over the voice communications channel using the SIP layer.

6. The method of claim 5, further comprising the data channel referencing a session ID of the control session.

7. The method of claim 5, further comprising authenticating to the surveillance camera via the control session.

8. The method of claim 5, wherein controlling the one or more streams of frames of image data comprises the client device sending control messages to the surveillance camera via an IP based control session of the voice communications channel.

9. The method of claim 5, wherein receiving the one or more streams of frames of image data sent by the surveillance camera comprises the client device receiving the streams of the frames of image data from the surveillance camera over a data channel of the voice communications channel.

10. A method for a mobile user device to access image data from a surveillance camera, the method comprising:

configuring the mobile user device as a voice over Internet protocol (VoIP) client endpoint;

configuring the surveillance camera as a VoIP server endpoint that automatically answers a call from the mobile user device based on the mobile user device being authenticated;

establishing, based at least in part on the call, a Session Initiation Protocol (SIP) based control session with the surveillance camera;

receiving, by the mobile device, a frame of image data over a half duplex data channel, where the frame of image data is included within Real time Transport Protocol (RTP) packets sent from the surveillance camera;

rendering, the mobile user device, the frame of image data on a display screen of the user mobile device; and processing another frame of image data to be sent over the half duplex data channel to the mobile user device by receiving the another frame of image data within Real time Transport Protocol (RTP) packets sent from the surveillance camera.

* * * * *